United States Patent [19]

Aitcin

[11] 4,287,167

[45] Sep. 1, 1981

[54] NOVEL HARZBURGITE AND PREPARATION THEREOF

[75] Inventor: Pierre C. Aitcin, Sherbrooke, Canada

[73] Assignee: Universite de Sherbrooke, Quebec, Canada

[21] Appl. No.: 88,352

[22] Filed: Oct. 26, 1979

[51] Int. Cl.$^3$ ............... C01B 33/24; C04B 35/04; C04B 35/20

[52] U.S. Cl. ............... 423/331; 106/58; 106/60; 106/62

[58] Field of Search ............... 423/331, 156; 106/60, 106/62, 58; 209/38, 636, 214

[56] References Cited

U.S. PATENT DOCUMENTS

| | | | |
|---|---|---|---|
| 1,926,094 | 9/1933 | Goldschmidt et al. | 106/58 |
| 2,026,088 | 12/1935 | Harvey et al. | 106/58 |
| 2,077,793 | 4/1937 | Harvey et al. | 106/60 |
| 2,077,795 | 4/1937 | Harvey et al. | 106/58 |
| 2,105,943 | 1/1938 | Goldschmidt | 106/60 |
| 2,216,813 | 10/1940 | Goldschmidt | 52/575 |
| 2,252,317 | 8/1941 | Goldschmidt | 106/59 |
| 2,335,407 | 11/1943 | Goldschmidt | 106/62 |
| 2,349,556 | 5/1944 | Kleckner | 423/156 |
| 2,516,249 | 7/1950 | Osborn | 106/62 |
| 2,691,443 | 10/1954 | Schoenlaub | 106/60 |
| 3,162,380 | 12/1964 | Cohen et al. | 423/331 |
| 3,178,298 | 4/1965 | Craig | 106/58 |

*Primary Examiner*—O. R. Vertiz
*Assistant Examiner*—Mark Bell
*Attorney, Agent, or Firm*—Cushman, Darby & Cushman

[57] ABSTRACT

There is provided a novel harzburgite of the formula $Py_xOl_{(1-x)}$ where x is a decimal number of from 0.001 to 0.4, Py is an abbreviation for pyroxene, and Ol is an abbreviation for olivine having a total iron oxide content of less than 5% which is obtained by calcining a demagnetized fraction from a magnetite-containing serpentinite. The novel harzburgite is useful for preparing refractories.

8 Claims, No Drawings

NOVEL HARZBURGITE AND PREPARATION THEREOF

The present invention relates to an unfused yet dense harzburgite for use in the manufacture of refractory products and to a process for its preparation.

BACKGROUND OF THE INVENTION

A common practice is to make forsterite products from olivinites, which are naturally occurring magnesium silicates rock containing essentially olivine which is a solid solution of forsterite ($2MgO.SiO_2$) and fayalite ($2FeO.SiO_2$). In such cases, finely divided magnesia can be added for the purpose of converting any more siliceous magnesian minerals carried in the olivinite to the more highly refractory forsterite. Nevertheless, it should be appreciated that the iron oxide in olivine is present in the form of fayalite and cannot be removed from the olivine. The disadvantage of fayalite is that it acts as a flux and thus decreases the resistance to heat of refractories made from olivine.

Forsterite products have been made also from other natural magnesium silicates of high refractoriness such as dunites which are essentially composed of olivine and small amounts of serpentine ($3MgO.2SiO_2.2H_2O$) and from other natural magnesium silicates of relatively low refractoriness, for example such hydrothermal alteration of magnesium silicates as serpentinites, talcs and steatites, by the addition of sufficient magnesia to form forsterite from these more siliceous magnesium silicates and hydrosilicates.

Extended use of forsterite brick made from such natural magnesium silicates has shown that under the conditions encountered in many high temperature applications they give markedly successful and satisfactory performance. However, it has been found that such forsterite brick undergo progressive deterioration when they are exposed at elevated temperatures alternately to oxidizing and reducing conditions, exemplified by the cyclic operation of glass tank regenerators. More in detail, these bricks under such cyclic conditions undergo progressive loss of bond, and ultimately they disintegrate. Accompanying those phenomena is an expansion that may amount to as much as 5 percent, with the possibility of creating undesirable stress conditions to the structure.

It is also known that the iron oxide content of bricks made from natural olivines is a limiting factor, and as a trend toward higher regenerator temperatures develops, and often increasing pollution from the furnace gases with batch constituents occurs, it has become increasingly apparent that the natural magnesium silicate rocks have reached the limit of their usefulness because of inherent iron content.

After appreciating the disadvantage of too high an iron content in natural olivines or other natural magnesium silicate rocks the industry attempted to prepare improved forsterite refractory bricks by the use of synthetic forsterite made by firing a mixture of high purity silica with high purity synthetic magnesia. Nevertheless, though this procedure is highly effective it requires the expensive pure magnesia and pure silica. Dead burned magnesia is obtained at temperature above 1600° C., and after cooling it is ground to a proper grain size before it can be used for the manufacture of synthetic forsterite brick. Obviously all the operations contribute to the high cost of the final product.

Finally, others have appreciated that the presence of iron eventually caused certain deficiencies in refractory bricks made from naturally occurring magnesium silicates and therefore attempted to decrease the iron content by combining a substantially iron-free periclase with a natural magnesium silicate whereby the total iron content was reduced to less than 3%. It has been noted that such refractory bricks present certain disadvantages because of the disproportionate ratio of magnesium oxide to silicon oxide while having a very low iron oxide content.

It is also known that serpentinite, more particularly chrysotile asbestos tailings contains the constituents of olivine, that is magnesium oxide, silica oxide and ferric oxide though in different proportions. It is also known that there is an enormous amount of chrysotile asbestos tailings and residues in countries where asbestos mining is carried to a large extent so that it would appear that great advantages could be derived if a satisfactory method could be found to modify or convert the plentiful asbestos tailings to an olivine-like material, more particularly to an harzburgite and to provide a magnesium silicate having a very low iron oxide content and a chemical composition which approximates the composition of forsterite as far as the ratio of silica to magnesia is concerned.

Accordingly, in view of the exceedingly large amounts of chrysotile asbestos tailings and residues presently available in many parts of the world, and in view of the low commercial value of these tailings, it would appear highly desirable if a process could be used to convert these tailings to harzburgite materials suitable for the manufacture of refractory bodies.

SUMMARY OF THE INVENTION

In accordance with the present invention, there is provided a novel harzburgite which is a mixture of olivine and pyroxene corresponding to the general formula:

$$Py_xOl_{(1-x)}$$

wherein
x is a decimal number of from 0.001 to 0.4,
Py is an abbreviation for pyroxene, and
Ol is an abbreviation for olivine.
Pyroxenes are solid solutions of enstatite ($MgO.SiO_2$) and ferrosillite ($FeO.SiO_2$).

The novel process essentially prepares an artificial harzburgite having a $Fe_2O_3$ content of less than 5% and a ratio of $MgO/SiO_2$ of from between 1.0:1 to 1.3:1 from naturally occurring magnetite-containing serpentinite, more particularly, from chrysotile asbestos mine tailings.

The process comprises first demagnetizing a magnetite-containing serpentinite, more particularly chrysotile asbestos mine tailings, by a dry process and after recovering the demagnetized fraction, calcining same to remove the water of crystallization whereby there is obtained a granular harzburgite having an iron oxide content of less than 5% and a ratio $MgO/SiO_2$ of from 1.0:1 to 1.3:1 thus providing a suitable product for the preparation of forsterite refractories.

As starting material, there may be used a serpentinite, and more particularly chrysotile asbestos mine tailings having a particle size preferably not greater than −4 mesh. The chrysotile asbestos mine tailings corresponding to the last grinding stage of the ore in the mill e.g.

−35, −28, −24, −16 mesh according to the mine where it is obtained, and the floats (a mixture of very short fibers and dust) collected in the dedusting system of the plant are suitable for the purpose of the present invention.

The demagnetization step is carried under dry conditions under procedures known in the art such as by passing the chrysotile asbestos mine tailings over an electromagnet whereby a major portion of the iron oxide in the tailings is retained by the magnet. A suitable demagnetizing apparatus is known as a MORTSELL ® apparatus distributed in Canada by Sala Machine Works of Mississauga Ont.

The calcination step is carried out as it is well known in the art at a temperature of between 1000° to 1450° C. The product of the present invention obtained is then pressed and fired at temperature varying from 1450° to 1550° C., i.e. in accordance with regular procedures used in the production of forsterite bricks.

It should be appreciated that a non demagnetized calcined magnetite-containing serpentinite has about the same chemical composition as olivine which is well known for making forsterite refractories. Table I shows a comparison of the various constituents of magnetite-containing serpentinite, calcined magnetite-containing serpentinite and olivine, and calcined non-magnetic asbestos mine tailings.

TABLE I

|  | $SiO_2$ % | Iron oxide % | $Al_2O_3$ % | MgO % | CaO % | L.O.I.* % |
|---|---|---|---|---|---|---|
| Magnetite-containing serpentinite | 34 | 9.2 | 0.4 | 41.4 | 0.1 | 15 |
| Calcined magnetite-containing serpentinite | 40 | 10 | 0.4 | 48 | 0.1 | — |
| Olivine | 42 | 6.5 | 0.7 | 49 | — | 1.2 |
| Calcined non magnetic asbestos mine tailing | 41.6 | 2.6 | — | 51.9 | — | — |

*Loss on ignition.

On the other hand, it is readily observed that there is a great difference between the iron in the olivine and the iron in the magnetite bearing serpentinite such as chrysotile asbestos mine tailings. In olivines the iron is in the form of an orthosilicate which is fayalite ($2FeO \cdot SiO_2$) which is a flux, whereas in chrysotile asbestos mine tailings the iron is found in the form of magnetite ($Fe_3O_4$). Because of the presence of fayalite in naturally occurring olivines, only those olivines having a total iron oxide content of not more than 6 to 10% can be used for making forsterite refractories.

It has been found in accordance with the present invention that chrysotile asbestos mine tailings can be readily demagnetized by a dry process and that the higher the ratio of $MgO:SiO_2$ is, the easier it is to demagnetize, the iron being concentrated in a smaller part of the total weight of the residue. For example, Table II shows the results of demagnetization of two chrysotile asbestos mine tailings of a low and high ratio of $MgO:SiO_2$.

TABLE II

| | % of total residue treated | |
|---|---|---|
| $MgO:SiO_2$ | magnetic fraction | non-magnetic fraction |
| 1.21 | 30 | 70 |
| 1.01 | 70 | 30 |

It has also been discovered that there is a relationship between the size of the residue and the ease of demagnetization. For example, Table III shows the result of demagnetization by a dry process of three different mine tailings from the same mine having different grain size distributions.

TABLE III

| | % of total residue treated | |
|---|---|---|
| Grain size | magnetic fraction | demagnetized fraction |
| −4 mesh | 29 | 71 |
| −28 mesh | 31 | 69 |
| floats | 77.5 | 22.5 |

It has also been found that the higher is the $MgO:SiO_2$ ratio the lower is the iron oxide content in the demagnetized fraction as shown in Table IV.

TABLE IV

| | | Iron oxide content | |
|---|---|---|---|
| $MgO:SiO_2$ | Initial | Magnetic fraction | Non-magnetic fraction |
| 1.25 | 10.0 | 26.8 | 2.2 |
| 1.21 | 9.2 | 24.4 | 2.4 |
| 1.11 | 9.7 | 11.3 | 4.0 |

According to the present invention, it has also been found that demagnetized magnetite-containing serpentinite can be used also for making forsterite refractories with the necessity of adding only small amounts of other materials rich in magnesia such as dead burned magnesia. This small amount of magnesia less than 10% in some cases, can be added to the novel harzburgite of the present invention to prepare a forsterite having a ratio of $MgO/SiO_2$ above 1.34 where it is desired to prepare refractories having special properties.

The calcined demagnetized magnetite-containing serpentinite material could be for example in granular form passing a 4-mesh sieve having an iron oxide content of less than 5% and an $MgO:SiO_2$ ratio of from 1.0:1 to 1.3:1.

The present invention will be more readily understood by referring to the following examples which are given only to illustrate the invention rather than to limit its scope.

EXAMPLE I 1000 pounds of a residue from a chrysotile asbestos mine located in the Eastern Townships of the Province of Quebec passing a −35 mesh sieve was subjected to a dry magnetic separation using a MORTSELL ® apparatus. The non-magnetic fraction represented 705 lb of the initial weight while the balance 295 lb constituted the magnetic fraction. The total iron content of the starting was 5.9% equivalent to 8.4% when calculated as $Fe_2O_3$ while in the demagnetized form the iron content has been reduced to 1.9% equivalent to 2.8% when calculated as $Fe_2O_3$.

The non-magnetic fraction was calcined in a kiln at a temperature of 1250° C. for a period of 6 hours. After calcination the chemical composition of the non-magnetic fraction was the following:

TABLE V

| $SiO_2$ | MgO | $Fe_2O_3$ | $Al_2O_3$ | CaO | Alkalies | $MgO/SiO_2$ |
|---|---|---|---|---|---|---|
| 44 | 52.4 | 2.8 | 0.3 | 0.1 | 0.1 | 1.19 |

The composition of this harzburgite is $Py_{0.08}Ol_{0.92}$

This material was pressed to 5000 psi and fired up to 1500° C. After firing the absorption of the refractory material was 1.3%, its specific gravity 2.60, and its cold crushing strength 21 300 psi. The specific heat capacity at room temperature was 0.19 Btu/lb/°F. (0.46 cal/cm$^3$/°C.). An X-ray diagram and an examination under polarized light shows that this refractory material was essentially composed of forsterite and contained only trace of enstatite.

EXAMPLE II 1000 pounds of a residue from a chrysotile asbestos mine located in the Eastern Townships of the Province of Quebec passing a −28 mesh sieve was subjected to a dry magnetic separation using a MORTSELL ® apparatus. The non-magnetic fraction represented 690 lb of the initial weight while the balance 310 lb constituted the magnetic fraction. The total iron content of the starting asbestos tailing was 7.24 equivalent to 10.35% when calculated as $Fe_2O_3$ while in the demagnetized form the iron content has been reduced to 1.59 equivalent to 2.3 when calculated as $Fe_2O_3$.

After calcination in a kiln at 1250° C. for a period of 6 hours the chemical composition of the non-magnetic fraction was the following:

TABLE VI

| $SiO_2$ | MgO | $Fe_2O_3$ | $Al_2O_3$ | CaO | Alkalies | $MgO/SiO_2$ |
|---|---|---|---|---|---|---|
| 42.6 | 53.1 | 2.6 | 0.7 | 0.2 | 0.1 | 1.25 |

The composition of this harzburgite is $Py_{0.03}Ol_{0.97}$

This material was pressed to 5000 psi and fired to 1500° C. After the firing the absorption of the refractory was 8.6%, its specific gravity 2.15 and its cold cruching strength 7,250 psi. An X-ray diagram and an examination under polarized light shows that this refractory material was essentially composed of forsterite.

EXAMPLE III

The demagnetized fraction obtained as in Example II was mixed with 5, 10, 15% of finely ground high purity periclase (passing 200 mesh) pressed to 5000 psi and fired up to 1500° C.

After the firing the following results were obtained:

TABLE VII

| Periclase added % | 5 | 10 | 15 |
|---|---|---|---|
| Absorption % | 10.6 | 12.6 | 13.4 |
| Specific gravity | 2.08 | 2.02 | 2.01 |
| Cold crushing strength psi | 4500 | 3050 | 3430 |
| Total shrinkage % | 3.3 | 2.3 | 1.6 |

I claim:

1. Process for preparing harzburgite having $Fe_2O_3$ content of less than 5% and having a ratio $MgO/SiO_2$ of from between 1.0 to 1.3 which comprises:
    (a) demagnetizing a magnetite-containing serpentinite by a dry process;
    (b) recovering the demagnetized serpentinite fraction;
    (c) calcining said demagnetized fraction thereby to transform the demagnetized serpentinite to an harzburgite having a $Fe_2O_3$ content of less than 5% and a ratio $MgO/SiO_2$ of from between 1.0 to 1.3.

2. The process of claim 1, wherein the starting magnetite-containing serpentinite is chrysotile asbestos mine tailings.

3. The process of claim 2, wherein the chrysotile asbestos mine tailings have a grain size not greater than −4 mesh.

4. The process of claim 2, wherein the chrysotile asbestos mine tailings have a grain size of from −35 to −4 mesh.

5. The process of claim 2, wherein the chrysotile asbestos tailings are in the form of floats.

6. The process of claim 1, wherein the demagnetized fraction contains a serpentinite having a $Fe_2O_3$ content of less than 5%, an $MgO/SiO_2$ ratio of from 1.0 to 1.3.

7. The process of claim 1, wherein the calcination step is carried out at a temperature of from 1000° to 1450° C.

8. A process which comprises calcining a demagnetized magnetite containing serpentinite to obtain a product containing less than 5% of $Fe_2O_3$ and having a chemical composition more similar to forsterite than natural olivine and substantially devoid of fayalite.

* * * * *